Patented Oct. 26, 1937

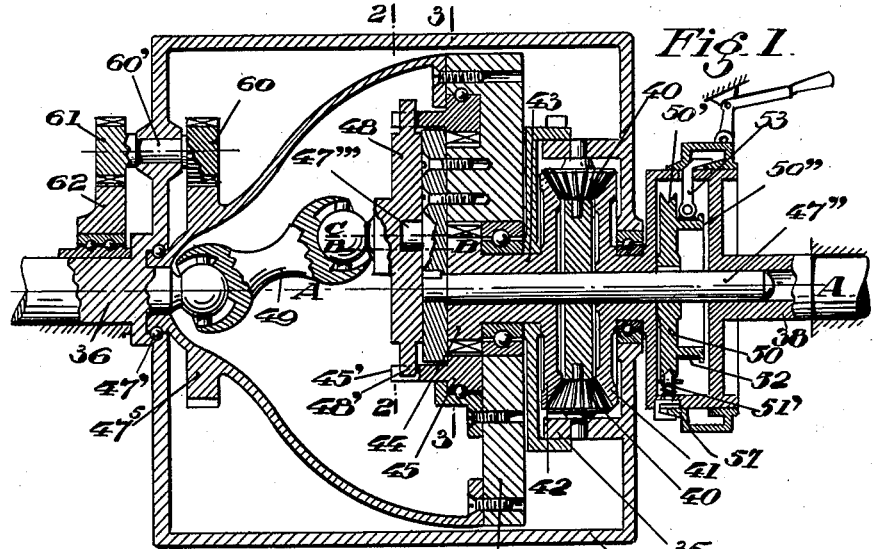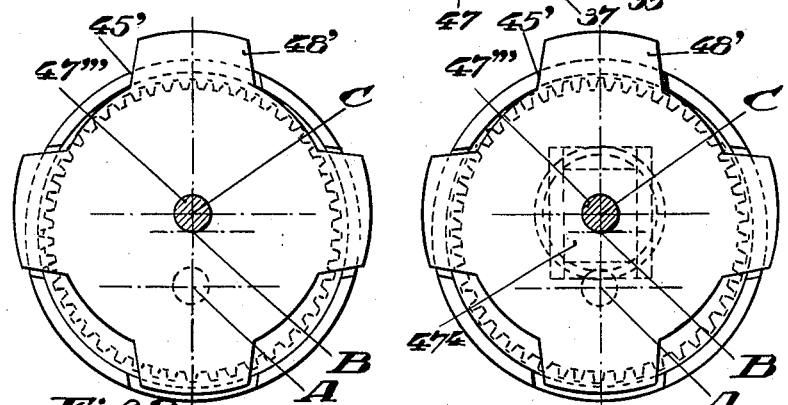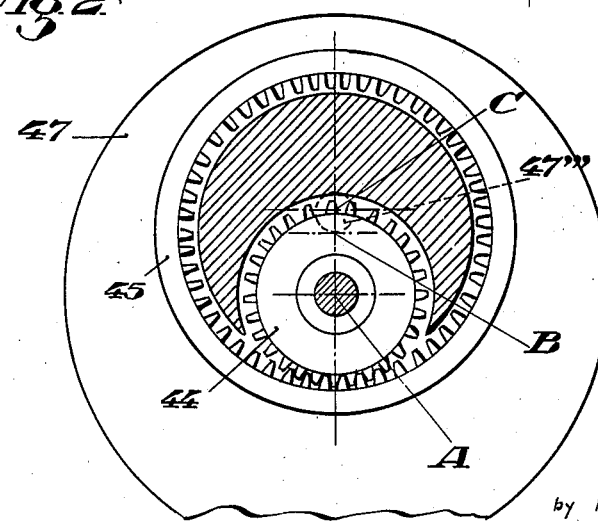

2,097,283

UNITED STATES PATENT OFFICE 2,097,283

CHANGE SPEED MECHANISM

Hans Kohn, Stoetten Oberamt Geislingen, near Stuttgart, Germany

Application December 26, 1935, Serial No. 56,143
In Germany January 2, 1935

16 Claims. (Cl. 74—283)

This invention relates to a change speed gear with an infinitely variable transmission ratio between the driving and driven shafts. The object of the invention is to provide such a gear in which the power transmitting parts are all positively connected together so that slip and consequent friction between power transmitting parts do not occur. All toothed wheels are to remain permanently in engagement with each other during alteration of the transmission ratio and the transmission of power is to take place without the use of reciprocating parts.

The gear in accordance with the invention comprises essentially a differential gear and an epicyclic gear connected to it. By suitable control of the latter, the transmission ratio can be constantly altered. This transmission ratio is determined by the relation between the rate of rotation of the part of the differential connected to the drive, that is to say, the driving part of the differential, to that of the driven part of the differential connected to the driven part of the gear. The rotation of the driven part of the differential can be altered at will through the agency of the epicyclic gear, with the result that the rotation of the driven part of the differential and that of the third, controlling part of the differential can be continuously altered. The latter part which belongs to the epicyclic gear, will be referred to in what follows as the "connecting part."

In order to alter the rate of rotation of this connecting part at will, the rolling movement of the wheel which is in engagement with the connecting part, that is to say, the rate of rotation of its carrier, can be constantly altered by suitable means.

In order to be able to provide a suitable abutment or reaction point in the carrier for the regulation, in spite of the rotation of all the power transmitting parts, the driving member is connected not only to the differential gear but also to the epicyclic gear. The chain of controlling parts, that is to say, the parts which serve for alteration of the transmission ratio, is also thus connected at two points, preferably at its two ends, to the drive.

A further object of the invention is to make it possible to alter the rate of rotation of the carrier with the least possible expenditure of power and, in particular, so that only torques of suitably small size have to be overcome or even so that the torques acting on the carrier are fully balanced. With partial or complete compensation or balancing of these torques, a further gear or gear member is mounted on the carrier; this exerts a torque at its bearing point which acts against the torque transmitted to the carrier through the rolling wheel. This additional gear member, which can be constructed as a toothed or cam wheel, engages with the rolling wheel preferably diametrically opposite the point of engagement of the pinion belonging to the connecting part. If the bearing of this gear member is displaceable relatively to the carrier, the two oppositely acting torques on the carrier can be fully balanced or, if desired, one can be made to exceed the other by only a small amount.

A suitable form of construction is obtained by connecting the drive to the planet support of the differential gear, connecting one sun-wheel of the differential gear to the driven shaft and the other sun-wheel to the connecting part leading to the epicyclic gear. In this way, the relative movements between the parts decreases as the rate of rotation of the driven shaft increases and finally, with the top gear ratio, there is no such relative movement at all so that the gear is the equivalent of a solid shaft. When running light, the connecting part runs twice as fast as the driving shaft. If the carrier is set in rotation or its rate of rotation is increased, the rate of rotation of the connecting part decreases and the rate of rotation of the driven sun-wheel of the differential increases correspondingly. The transmission ratio of the epicyclic gear is, for this purpose, preferably chosen as 1 is to 2.

As already mentioned, the equalization of the torques on the carrier can, as desired, be made more or less complete. If this is carried out so that there is a small resultant torque on the carrier in the direction of the drive, the transmission ratio can easily be altered by coupling the carrier yieldingly with the driven shaft. In this case, the carrier is urged constantly somewhat in advance of the driven member. If the coupling between the carrier and the driven shaft is somewhat released, owing to this tendency of the carrier to rotate faster, the rotation of the slower part is somewhat slackened, whereupon the driven sun-wheel of the differential rotates more rapidly. When the desired increase in the transmission ratio is obtained, the driven shaft need only again be coupled to the carrier in order that that transmission ratio may be permanently maintained.

If the rate of rotation of the carrier is to be altered by a special adjustable drive, it is necessary to adjust the parts of the drive mounted on the carrier so that their torques acting in opposition to each other are equalized or so that a weak resisting torque is exerted on the carrier.

A few of the many possible forms of construction in accordance with the invention are illustrated by way of example in the drawing, in which Figure 1 is an axial section through one form of construction of the gear as a whole.

Figures 2 and 3 are partial sections on the lines II—II and III—III of Figure 1, and Figure 4 shows a form of construction somewhat different from that of Figure 2.

The gear comprises essentially a differential gear 40, 41, 42, and an epicyclic gear 44, 45, 47 which are joined together by parts 42, 43, 44. The output sun-wheel 41 of the differential gear is fixed to the driven shaft 38 while the planet support 35 for the pinions 40 forms a part of the housing 37 which is fixed to the driving shaft 36. The input sun-wheel 42 of the differential is integrally formed with a pinion 44 to which it is connected by a sleeve 43 loosely mounted on a shaft 47″. The parts 42, 43, 44 will be referred to as the "connecting member". An internally toothed wheel 45 which is mounted freely in the member 47 and having an axis of rotation B—B engages with the pinion 44. The part 47 will be referred to as the "planet carrier" or "carrier" in contradistinction to part 35 referred to as "planet support". Carrier 47 is journalled in the driving shaft at 47′ and in the driven shaft 38 by means of shaft 47″ to which it is secured so that its axis of rotation A—A coincides with that of the driving and driven shafts. The connecting member 42, 43, 44 is journalled in the bearing member 47. The distance of the axis B—B from the axis A—A is fixed.

When the carrier 47 rotates about the axis A—A, the wheel 45 rolls on the pinion 44 in addition to rotating about the axis B—B. The connection between the wheel 45 and the driving shaft is as follows. A wheel 48, connected to the driving shaft 36 through a universal coupling 49, is mounted to rotate on a pin 47‴ on the carrier 47. The axis C—C of this pin, the axis A—A and the axis B—B all lie on a common diameter of the carrier 47. The wheel 48 has teeth 48′ (Figure 2), which engage in corresponding spaces 45′ in the wheel 45. The number of teeth 48 equals the number of spaces 45′ and can be of any desired magnitude. At any time, there is, practically speaking, only one tooth 48′ bearing on the flank of the space 45′ and at a point substantially diametrically opposite to the point of engagement of the pinion 44 with the wheel 45. (There are actually two teeth in engagement for a short time when one tooth is about to lose engagement and the following tooth is about to engage.) The transmission ratio of the gear varies with variation in the rate of rotation of the bearing member 47. When idling, that is to say, when the driven parts 38, 41 are at rest, the planet wheels 40 roll as they rotate about the stationary sun-wheel 41. The sun-wheel 42 is thus rotated at double the speed of the planet support 35 or the driving shaft 36. (Whatever the transmission ratio may be, the sum of the rate of rotation of the sun-wheels 41, 42 is always twice as large as the rate of rotation of the driving shaft.) If, as is preferable, the gear ratio of the wheels 44, 45 is as 1 is to 2, the large wheel 45, at no load, rotates half as fast about its axis B—B as its pinion 44 rotates about the axis A—A, so that it has the same rate of rotation as the planet support 35 and the driving shaft 36.

The driven shaft 38 is set in motion or its speed is increased as a consequence of a decrease in the speed of the sun-wheel 42, or of the connecting member 42, 43, 44. As the sum of the rates of rotation of the sun-wheels 41 and 42 is always twice as great as the rate of rotation of the driving parts 35, 36, the rate of rotation of the driven sun-wheel 41 increases in the same ratio as the rate of rotation of the sun-wheel 42 is lowered. This lowering of the rate of rotation of the connecting member 42, 43, 44 is brought about by causing the carrier 47 to rotate about its axis A—A in the same direction as the driving shaft. This causes the wheel 45 to roll round the pinion 44 in the sense of rotation of the driving shaft. The rate of rotation of the connecting member 44, 43, 42 is lowered in accordance with the rate at which the wheel 45 rolls round the pinion 44 and this leads to the wheel 41 and, therefore, the driven shaft 38, being set in motion or being rotated more quickly. The top gear ratio, that is to say, the direct drive, is obtained when the carrier 47 rotates at the same speed as the driving parts 36, 37, 35, 48, 45. In this case, the connecting member 44, 43, 42 also, however, has the same speed of rotation as, therefore, have the driven sun-wheel 41 and the driven shaft 38. It will be clear that in this case, all parts of the gear are at rest relatively to each other. They rotate about the shaft 36, 38 as a single member so that friction and wear are entirely eliminated.

At the axis B—B of the carrier through which the alteration in the transmission ratio is effected by adjustment of its rate of rotation, there acts a resisting torque which is produced by the reaction of the wheel 45 on this carrier as a consequence of its engagement with the pinion 44. If this resisting torque were to act alone on the member 47, regulation of its speed of rotation would be difficult and would necessitate the application of a large force. In order to reduce this resisting torque to the desired extent, to overcome it completely or substantially, the wheel 48 is journalled on the member 47 and, indeed, in such a way that its axis C—C lies near the axis B—B, coincides with it or, as illustrated, lies on the side of it remote from the axis A—A. The wheel 48, which is directly connected to the driving shaft 36, exerts a torque on the carrier 47 through its bearing pin 47‴ which acts in opposition to that produced by the wheel 44. Thus, by suitable choice of the distance of the axes B—B and C—C from each other, it is possible to make these two torques equal to each other. The bearing pin 47‴ can advantageously be mounted in a slide 47⁴ which is radially adjustable in the member 47 (see Figure 4).

If, as is illustrated in Figure 1, the pin 47‴ is so arranged that its axis C—C lies further from the axis A than does the axis of rotation B—B, there will be a slight resultant torque in the direction of the drive acting on the carrier 47. In that case, the member 47 tends to run somewhat in advance of the driven shaft 38. In this case, the transmission ratio can be altered in a simple manner as follows: A disc 50 having a circumferential groove 50′ is keyed to the shaft 47″ of the carrier 47. A bolt 51 is pressed into this groove by means of a spring 51′, the bolt being mounted on the driven member 41, 38. The bolt 51 holds the carrier 47 so that it cannot run faster than the driven shaft 38. If, for the purpose of increasing the transmission ratio, the bolt 51 is removed from the groove 50, the carrier 47 can rotate faster than the driven shaft 38. The large wheel 45 is thus caused to roll further on the pinion 44 so that the connecting part 44, 43, 42, is rotated more slowly to that extent. Consequently, the rate of rotation of the driven part 41, 38 increases until the bolt 51, by engagement in the groove 50, prevents this raising of the transmission ratio.

The transmission ratio is automatically lowered to the extent to which the driven shaft 38 runs more slowly. This reduction in the transmission ratio can be effected in a simple manner and with the application of small forces by reducing the rate of rotation of the approximately balanced carrier 47, by braking it, as illustrated. The disc 50 carries a brake drum 50" comprising a braking member 52 which can be operated from the outside in any desired fashion, for example by means of the device 53. The bolt 51 and the braking member 52 are preferably alternately actuated by a common controlling device.

If the two driving parts 45 and 48 mounted on the member 47 act on the member 47 in such a manner that their torques acting in opposite directions are compensatory or so that a slight resisting torque is exerted on the member 47, the rate of rotation of the member 47 can be adjusted by a variable drive. The rate of rotation of the carrier 47 can be adjusted by any suitable means. If the rate of rotation of the carrier 47 is to be adjusted from the driving side instead of from the driven side, its bearing 47' can, for example, be constructed in a similar manner to that which is shown for the parts 50—53 in connection with the driven side.

Alternatively, as is shown in Figure 1, a toothed wheel 47[5] on the carrier 47 can be caused to engage with a pinion 60, the spindle 60' of which passes through the casing 37 and has fixed to it outside the casing a pinion 61 of the same size as the pinion 60. A toothed wheel 62 mounted to rotate on the driving shaft 36 engages with this pinion 61. Its rate of rotation can be varied in any desired manner. In this way, the drive 36 and the carrier 47 can rotate independently of each other so that the pinions 60, 61 carry out corresponding rolling movements relatively to their toothed wheels 47[5] and 62 and, nevertheless, the carrier 47 arranged within the casing 37 can have its speed of rotation regulated as desired from the outside.

I claim:—

1. A change-speed mechanism comprising a driving shaft, a driven shaft, a differential gear positively connected to said driving shaft and said driven shaft, a toothed wheel having a fixed axis of rotation positively connected to said differential gear, a toothed wheel adapted to roll round said first mentioned toothed wheel, a carrier for said second mentioned toothed wheel, a rotary member mounted on said carrier and serving to connect said second mentioned toothed wheel to said driving shaft, said rotary member being in driving engagement with said second mentioned toothed wheel at a point substantially diametrically opposite the point of engagement of said toothed wheels and means for varying the rate of rotation of said carrier.

2. A change-speed mechanism as claimed in claim 1 in which said carrier is yieldingly coupled to said driven shaft.

3. A change-speed mechanism as claimed in claim 1 comprising means for braking the movement of said carrier.

4. A change-speed mechanism as claimed in claim 1 in which said means for varying the rate of rotation of said carrier comprise gear teeth on said carrier, a gear wheel mounted for rotation on said driving shaft and gearing mounted for rotation with said driving shaft and about the axis of said driving shaft and engaging with said gear teeth and said gear wheel.

5. A change-speed mechanism, comprising a driving shaft, a driven shaft coaxial with said driving shaft, a differential gear having a pair of sun wheels coaxial with said driven shaft, one of said sun wheels being positively connected to said driven shaft, a planet wheel and a carrier for said planet wheel positively connected to said driving shaft, an internally toothed gear wheel driven by said driving shaft about an axis parallel to but displaced from the axis of rotation of said shaft, an externally toothed wheel positively connected to that of said sun wheels not connected to said driven shaft and meshing with said internally toothed wheel and means for rotating said internally toothed wheel about the axis of rotation of said driving shaft.

6. A change-speed mechanism comprising a driving shaft, an internally toothed wheel adapted to be rotated about its own axis by said driving shaft and about the axis of said driving shaft, an externally toothed wheel in permanent engagement with said internally toothed wheel and disposed coaxially with said driving shaft, a differential gear having an input sun wheel positively connected to said externally toothed wheel, an output sun-wheel positively connected to said driven shaft and a planet wheel adapted to be rotated about the axis of said sun wheel by said driving shaft, and means for varying the rate of rotation of said internally toothed wheel about the axis of said driving shaft.

7. In a change speed mechanism comprising a driving shaft, and a driven shaft, the combination of an epicyclic train arranged between said shafts, and including a planet wheel, a sun wheel and a planet wheel carrier, said epicyclic train being of the type in which the transmission ratio may be varied by varying the rate of rotation of its planet wheel carrier, with a rotary element meshing with said planet wheel and being supported for rotation on said planet wheel carrier whereby the torque acting on said planet wheel carrier due to the interaction of said sun wheel and said planet wheel may be at least partially compensated by a torque acting on said planet wheel carrier in the opposite sense through said rotary element.

8. In a change speed mechanism comprising a driving shaft, and a driven shaft, the combination of an epicyclic train arranged between said shafts, and including a planet wheel, a sun wheel and a planet wheel carrier, said epicyclic train being of the type in which the transmission ratio may be varied by varying the rate of rotation of its planet wheel carrier, with a rotary element meshing with said planet wheel and mounted for rotation on said planet wheel carrier excentrically with respect to the axis of said driving shaft, said rotary element being in driving connection with said driving shaft.

9. In a change speed mechanism comprising a driving shaft, and a driven shaft, the combination of an epicyclic train arranged between said shafts, and including a planet wheel, a sun wheel, and a planet wheel carrier, said epicyclic train being of the type in which the transmission ratio may be varied by varying the rate of rotation of its planet wheel carrier, with a rotary element meshing with said planet wheel and supported for rotation on said planet wheel carrier, the axis of said rotary element, of said planet wheel, and of said driving shaft lying on a common diameter of the planet wheel carrier, whereby the torque acting on said planet wheel carrier due to the interaction of said sun wheel and said planet wheel may be at least partially compensated by a torque acting on said planet wheel carrier in the opposite sense through said rotary element.

10. In a change speed mechanism comprising a driving shaft, and a driven shaft, the combination of an epicyclic train arranged between said shafts, and including a planet wheel, a sun wheel and a planet wheel carrier, said epicyclic train being of the type in which the transmission ratio may be varied by varying the rate of rotation of its planet wheel carrier, with a rotary element meshing with said planet wheel and mounted for rotation on said planet wheel carrier excentrically with respect to the axis of said driving shaft, said rotary element being in driving connection with said driving shaft, the axes of said rotary element, of said planet wheel, and of said driving shaft lying on a common diameter of the planet wheel carrier.

11. In a change speed mechanism comprising a driving shaft, and driven shaft, the combination of an epicyclic train arranged between said shafts, and including a planet wheel, a sun wheel and a planet wheel carrier, said epicyclic train being of the type in which the transmission ratio may be varied by varying the rate of rotation of its planet wheel carrier, with a rotary element meshing with said planet wheel and supported for rotation on said planet wheel carrier, the axis of said rotary element being displaceable parallel to itself, the axis of said rotary element, of said planet wheel, and of said driving shaft lying on a common diameter of the planet wheel carrier, whereby the torque acting on said planet wheel carrier due to the interaction of said sun wheel and said planet wheel may be at least partially compensated by a torque acting on said planet wheel carrier in the opposite sense through said rotary element.

12. In a change speed mechanism comprising a driving shaft, and a driven shaft, the combination of an epicyclic train arranged between said shafts, and including a planet wheel, a sun wheel and a planet wheel carrier, said epicyclic train being of the type in which the transmission ratio may be varied by varying the rate of rotation of its planet wheel carrier, with a rotary element supported for rotation on said planet wheel carrier and meshing with said planet wheel at a point which is substantially diametrically opposite to the point of engagement of said planet wheel and said sun wheel whereby the torque acting on said planet wheel carrier due to the interaction of said sun wheel and said planet wheel may be at least partially compensated by a torque acting on said planet wheel carrier in the opposite sense through said rotary element.

13. In a change speed mechanism comprising a driving shaft, and a driven shaft, the combination of an epicyclic train arranged between said shafts, and including a planet wheel, a sun wheel and a planet wheel carrier, said epicyclic train being of the type in which the transmission ratio may be varied by varying the rate of rotation of its planet wheel carrier, with a rotary element meshing with said planet wheel and supported for rotation on said planet wheel carrier, the axes of said rotary element, of said planet wheel, and of said driving shaft lying on a common diameter of the planet wheel carrier, and the axis of said rotary element being arranged at the same side of and at a slightly greater distance from the axis of said driving shaft than the axis of said planet wheel, whereby said planet wheel carrier may be constantly urged somewhat in advance of said driven shaft by a torque acting on said planet wheel carrier through said rotary element.

14. In a change speed mechanism comprising a driving shaft, and a driven shaft, the combination of an epicyclic train arranged between said shafts, and including a planet wheel, a sun wheel and a planet wheel carrier, said epicyclic train being of the type in which the transmission ratio may be varied by varying the rate of rotation of its planet wheel carrier, with means in engagement with said planet wheel carrier for at least partially compensating the torque acting on said planet wheel carrier due to the interaction of said sun wheel and said planet wheel, and means for yieldingly coupling said planet wheel carrier with said driven shaft.

15. In a change speed mechanism comprising a driving shaft, and a driven shaft, the combination of an epicyclic train arranged between said shafts, and including a planet wheel, a sun wheel and a planet wheel carrier, said epicyclic train being of the type in which the transmission ratio may be varied by varying the rate of rotation of its planet wheel carrier, with means in engagement with said planet wheel carrier for at least partially compensating the torque acting on said planet wheel carrier due to the interaction of said sun wheel and said planet wheel, a disengageable, yielding coupling means between said planet wheel carrier and said driven shaft, means for braking said planet wheel carrier, and operable means for alternatively actuating said coupling means and said braking means.

16. In a change speed mechanism comprising a driving shaft, and a driven shaft, the combination of an epicyclic train arranged between said shafts, and including a planet wheel, a sun wheel and a planet wheel carrier, gear teeth on said planet wheel carrier, a gear wheel rotatably mounted on said driving shaft, planetary wheels for which said gear teeth and said gear wheel form the sun wheels, said planetary wheels being connected together with a common axis and being adapted to be driven round the axis of the driving shaft by the latter, and means in engagement with said planet wheel carrier for at least partially compensating the torque acting on said planet wheel carrier due to the interaction of said first mentioned sun wheel and said planet wheel.

HANS KOHN.